United States Patent [19]

Rice

[11] Patent Number: 4,846,553

[45] Date of Patent: Jul. 11, 1989

[54] FOLDABLE VIEWER

[76] Inventor: Richard Rice, 1613 Manning, Unit D, Los Angeles, Calif. 90024

[21] Appl. No.: 72,887

[22] Filed: Jul. 14, 1987

[51] Int. Cl.$^4$ .......................... G02B 7/02; G02B 23/18
[52] U.S. Cl. ..................................... 350/250; 350/546; 350/140; 40/365
[58] Field of Search ....................... 350/250, 546, 140; 40/365; 248/460, 461

[56] References Cited

U.S. PATENT DOCUMENTS

| | | | |
|---|---|---|---|
| 2,696,754 | 12/1954 | Mamock | 350/250 |
| 2,724,991 | 11/1955 | Levine | 350/140 |
| 2,789,460 | 4/1957 | Kaufman | 350/140 |
| 2,933,015 | 4/1960 | Somach | 350/140 |
| 3,386,194 | 6/1968 | Kaufman | 40/365 |
| 4,443,071 | 4/1984 | Ueda | 350/546 |
| 4,478,498 | 10/1984 | Ohno | 350/546 |
| 4,549,785 | 10/1985 | Vitrac | 350/250 |

FOREIGN PATENT DOCUMENTS 675509  7/1952  United Kingdom ................ 350/250

*Primary Examiner*—Bruce Y. Arnold
*Assistant Examiner*—Loha Ben
*Attorney, Agent, or Firm*—Ashen Golant Martin & Seldon

[57] ABSTRACT

A foldable viewer includes a front wall having a pair of lens-receiving openings and a pair of optical lenses affixed thereto. A rear wall is included and has a pair of openings over which transparencies depicting stereoscopic images are affixed. The front and rear walls are attached to top, bottom and side walls to create a box-like structure when assembled. The walls cooperate to form a bellows-like structure that permits the viewer to be flattened for storage, mailing or placement in a magazine-like publication.

22 Claims, 5 Drawing Sheets

FIG. 11
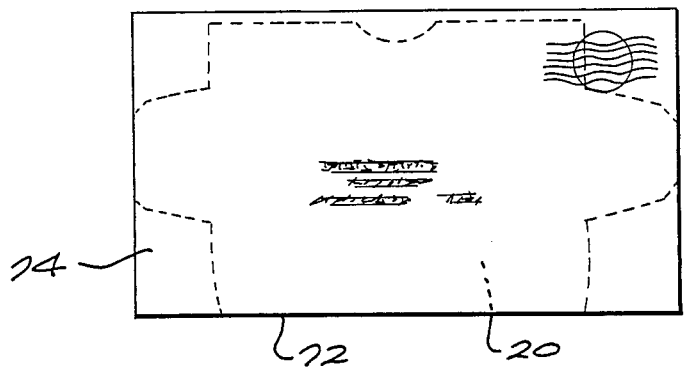
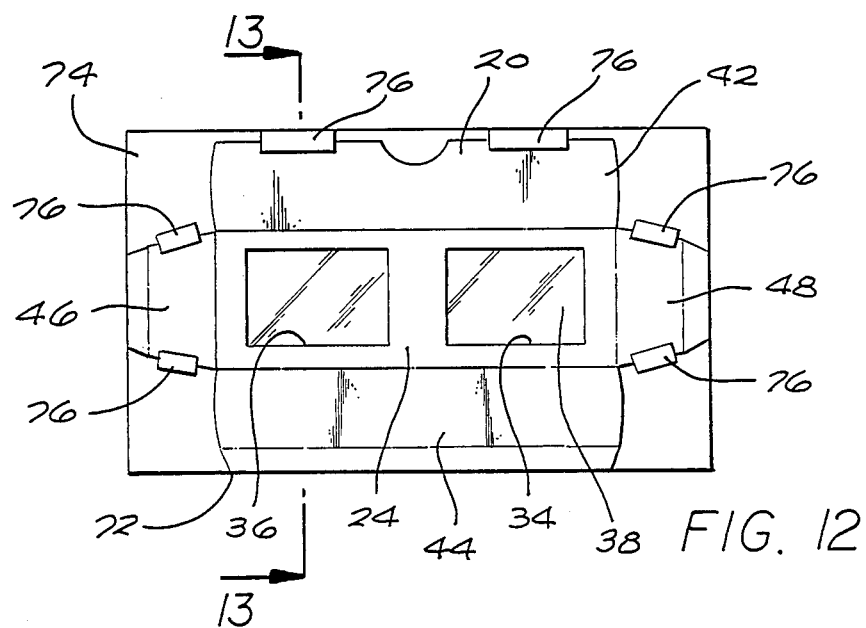
FIG. 12
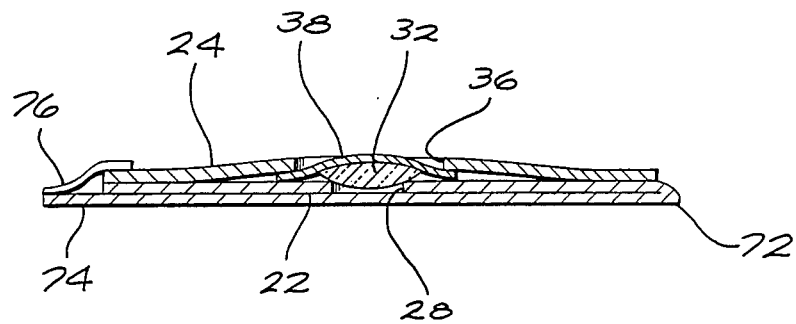
FIG. 13

FOLDABLE VIEWER

BACKGROUND OF THE INVENTION

1. Field of the Invention

The present invention relates generally to stereoscopic viewers and more particularly to a foldable viewer that can be placed in a magazine or similar publication for advertising or promotional purposes. In one form of the invention a protective backing integral with the foldable viewer is included to form a postcard which allows the viewer to be sent in direct mail without the need for an additional mailing envelope. The invention is also directed to the single blank used to form the foldable viewer and the postcard embodiment.

2. Prior Art

Collapsible viewers are well known devices in the art that have been constructed in various shapes and sizes, some of which are relatively expensive to manufacture. Most viewers are made from cardboard or paperboard and usually include a pair of optical lenses aligned with a pair of stereoscopic images appearing on slides, film strips, or other transparencies. The stereoscopic images take on a three-dimension effect when the user views them through the optical lenses.

Usually, the user holds the viewer up to a light source so that background light can illuminate the transparencies and produce the three-dimensional effect. Some prior art viewers have been constructed as box-like enclosures to create a darkened area between the optical lenses and the transparencies. This darkened ara helps enhance the three-dimensional effect and increases the clarity and illusion of reality of the image. There are problems, however, associated with prior art collapsible box-type viewers that have diminished their usefulness.

Generally, most box-type viewers are constructed from a single cardboard blank having numerous flaps and tabs that must be folded and placed within appropriate slots that are also formed on the blank. The design of most box-type viewers allows the viewer to be collapsed from the assembled or viewing position to a flattened position for storage. This collapsibility feature generally increases the complexity of the blank and usually requires the blank to be preassembled to create the foldable viewer. Once the blank has been preassembled, the finished viewer can be easily collapsed and reassembled by its user.

The intricacy of these blanks, however, usually requires the manufacturer to preassemble the viewers by hand, preventing the use of high speed machinery to assemble the finished product. As a result, a manufacturer usually has to hire additional labor to preassemble the blanks, thus reducing production speed and decreasing profits.

As an alternative, a manufacturer can sell unassembled blanks to its buyers, leaving the buyers to assemble the foldable viewers. However, the preassembly can be quite tedious and may require elaborate instructions to permit the user to properly construct the finished product. In many cases, the viewer may be so complicated to assemble that the usr loses interest in it and may even discard it, rather than take the time to assemble it properly.

The thickness and the number of walls or panels making up prior art viewers can also create a thick profile that prevents the viewers from being used in certain applications. For example, prior art viewers have not been placed in magazines or similar publications for advertising or promotional purposes since each viewer would cause an undesirable bulge in the magazine, a feature that is not acceptable by most national magazines. In fact, most national magazine publishers have strict thickness requirements for any insertion to prevent this unwanted bulge. While some prior art viewers can be folded somewhat flat for mailing purposes, the thickness of most prior art viewers is usually too large to permit a publisher to place them in publications. As a result, prior art foldable viewers have not been effectively used as an inexpensive advertising medium that can be easily inserted into magazines and distributed to consumers.

As an alternative, the blank that forms the viewer could possibly be placed in a magazine. However, the elaborate assembly needed to construct most viewers would be detrimental since many consumers may not bother to constuct the device to view the advertised products. For these reasons, advertisers have refrained from using prior art viewers to advertise their products. Advertisers appear to be more willing to use foldable viewers for advertising purposes provided that the viewers are relatively inexpensive to manufacture and are simple to construct.

SUMMARY OF THE INVENTION

The present invention has as its objective the elimination of these and other problems associated with prior art stereoscopic viewers. The present invention provides a simple, inexpensive, thin-walled viewer that can be easily assembled and used for educational, entertainment or advertising purposes. The design of the present invention provides a foldable viewer that has a profile, when collapsed, that is genrally no thicker than the thickness of two walls or panels that form the viewer. This design is advantageous since the thin profile permits the folded viewer to be easily placed in national magazines or similar publications that have strict thickness requirements for its insertions.

Once a user opens a magazine and finds a viewer, he or she can quickly remove and assemble the device to view the item that is being advertised. Thus, the present invention provides an inexpensive, yet effective, advertising or promotional item that can be easily distributed to the public.

The present invention provides a foldable viewer that is movable from a flattened or collapsed position to an assembled position for viewing. The viewer includes a front wall having a pair of lens-receiving openings and a pair of optical lenses affixed to it. The viewer also includes a rear wall having viewing means such as transparencies or other film media affixed to it. Stereoscopic images appear on these transparencies and are aligned with the pair of optical lenses to create a three-dimensional effect when a user looks through the viewer. The viewer includes means, referred to as the "moving means," for moving the front and rear walls from the collapsed position to the assembled position.

The preceding paragraphs provide an informal introduction to the invention. A more rigorous summary of the disclosure follows.

More particularly, the foldable viewer includes a top and bottom wall that are each pivotally attached or connected to the front and rear walls. Each top and bottom wall includes a transverse fold line that extends across the wall to create a bellows-like fold construction. The viewer may also include a pair of side walls that are also pivotally attached to the front and rear walls. Each side wall includes a fold line that permits at least a portion of the side wall to fold flat against another portion of the same side wall when the viewer is placed in its collapsed position. These side walls are designed to extend outward away from the front and rear walls when the viewer is in its flattened or collapsed position. The top, bottom and side walls cooperate to create a bellows-type structure that moves the front and rear walls from the collapsed to the assembled position.

The top wall also includes an advantageous top holding tab that extends transversely along the length of the top wall. This top holding tab is adapted to fit between two fingers of a user for greater ease in handling the viewer. Also, each side wall has a side holding tab that permits the user to move the viewer from the collapsed to the assembled position by simply moving the side tabs toward each other.

These side holding tabs also help the user in focusing the optical lenses with the viewing material. Alternatively, a user can also focus the viewer by simply squeezing the top and bottom walls toward or away from each other to vary the distance between the optical lenses and the viewing material.

The invention also includes means, similarly referred to as the "holding means," for holding the collapsed viewer in a magazine or a magazine-like publication. These holding means may take the form of an integral holding wall that extends from one of the walls of the viewer and which can be placed or glued into the spine of a magazine. The holding wall includes a perforated line which permits the foldable viewer to be ripped from the magazine by the user.

The invention can also take a form in which the collapsed viewer is folded flat and is fastened against a rectangular-shaped wall that is integral with the viewer. The rectangular wall and viewer cooperate to form a postcard which permits the viewer to be sent in direct mail to a user. The user simply detaches the rectangular wall and assembles the viewer to see the material appearing on the tarnsparencies. This embodiment provides a handy unit for mailing the foldable viewer and eliminates the need for an additional mailing envelope.

The invention also encompasses the blank used to create the preferred embodiment of the foldable viewer. The blank is advantageous since it can be assembled quickly and easily by simply folding and gluing portions of the blank together. The design of the blank permits high speed machinery to be used to assemble the viewer. Also, the design of the blank produces a viewer which has a profile that is generally no thicker than the thickness of two of the walls that make up the viewer. This design permits the collapsed viewer to be placed in national magazines that have strict thickness requirements for inserts. Also, the specific design of the blank create an unitary structure that allows a lighter grade of cardboard or paperboard to be used to form the viewer. The use of the lighter weight paper also reduces the overall thickness of the flattened viewer since the thickness of each wall is reduced.

The present invention thus provides an advantageous viewer that is easy to assemble and has a thin profile when collapsed. This thin profile permits the present invention to be placed in magazines or magazine-like publications, a feat that was virtually impossible with the multiwall, foldable viewers used in the past. Thus, the present invention can be effectively used for advertising, promotional, educational or entertainment purposes. Also, due to its simple design, the viewer can be easily assembled for viewing by the user.

The simple construction of the blank permits high speed machinery to be used to preassemble the viewer, thus reducing the amount of manual labor a manufacturer has to rely on to preassemble the blank into its commmercial form. Thus, production of the viewer can be increased with reduced costs.

DETAILED DESCRPTION OF THE DRAWINGS

A complete understanding of the present invention and other advantages and features thereof may be gained from a consideration of the following description of the preferred embodiments taken in conjunction with the accompanying drawings in which:

FIG. 11 is a plan view of another embodiment of the foldable viewer that forms a postcard that can be sent in direct mail.

FIG. 12 is a bottom view of the foldable viewer as it is shown in FIG. 11.

FIG. 13 is a cross-sectional view of the foldable view taken along line 13—13 of FIG. 12.

DETAILED DESCRIPTION OF THE PREFERRED EMBODIMENTS

Figure 1:
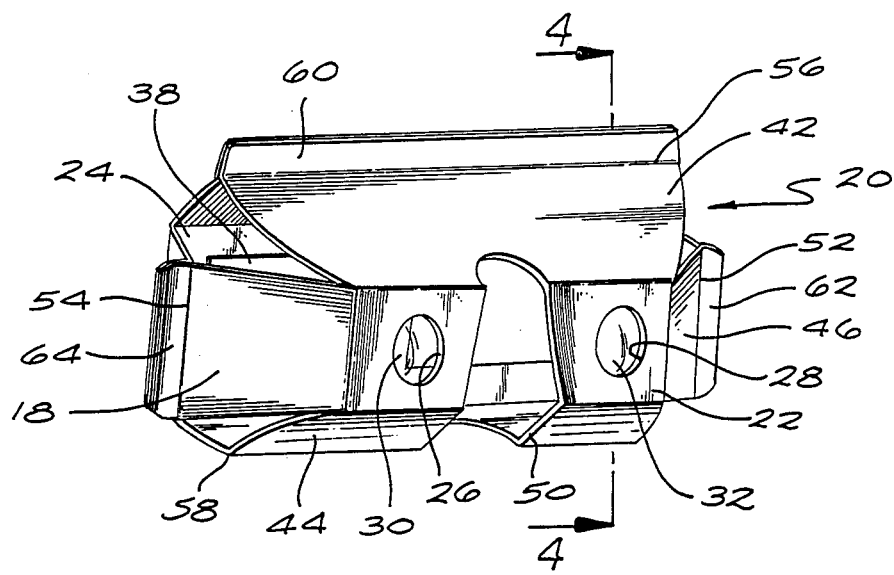
FIG. 1 is a perspective view of the assembled foldable viewer built in accordance with the present invention.
Figure 2:
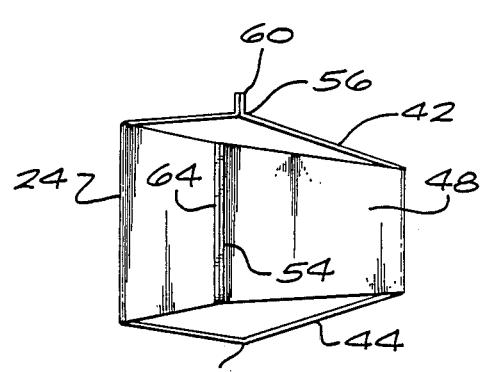
FIG. 2 is a side elevational view of the viewer as it is shown in FIG. 1.

While the present invention is susceptible of various modifications and alternative constructions, the embodiments shown in the drawings will herein be described in detail. It should be understood, however, it is not the intention to limit the invention to the particular forms disclosed, but on the contrary, the intention is to cover all modifications, equivalences and alternative constructions falling within the spirit and scope of the invention as expressed in the appended claims.

A foldable viewer 20 built in accordance with the present invention is shown in FIG. 1 as it appears in its assembled position. The viewer 20 includes a front wall 22 and a rear wall 24. The front wall 22 includes a pair of lens-receiving openings 26 and 28. A pair of optical lenses 30 and 32 are affixed to the front wall 22 directly over these openings 26 and 28. The rear wall 24 also has a pair of openings 34 and 36 (see FIGS. 5 and 6) over which viewing means, such as a transparency 38 is placed. This transparency 38 contains the stereoscopic images that appear in three-dimension when a user views the images through the optical lenses 30 and 32. The transparency 38 may be a single sheet that extends over the two openings 34 and 36 or may be a pair of sheets that are placed over these openings 34 and 36.

In a preferred form, the moving means may take the form of a movable top and bottom wall 42 and 44. Both the top and bottom walls 42 and 44 are connected to the front and rear walls 22 and 24. The point of connection of the top and bottom walls with the front and rear walls is generally defined by fold lines that allow the respective walls to pivot from the collapsed position shown in FIG. 6 to the assembled position shown in FIG. 1. The top and bottom walls are generally aligned flat and parallel to the front and rear walls when the viewer is in the collapsed position shown in FIG. 6. When the viewer is assembled, the top and bottom walls are generally at 90° angles with the front and rear walls.

The viewer 20 also includes a side wall 46 located near the right side of the viewer and another side wall 48 located near the left side of the viewer. These side walls 46 and 48 are also pivotally attached to the front and rear walls and serve as means for moving the front and rear walls. The point of connection between the side walls and the front and rear walls are also fold lines that allow the walls to pivot freely through the positions shown in FIG. 1 and 6. Like the top and bottom walls, the side walls are substantially parallel to the front and rear walls when the viewer is in the collapsed position. When the viewer is fully assembled, the side wals 46 and 48 are generally at a 90° angle with the front and rear walls.

The top, bottom front, rear and side walls shown in the drawings and described in the specifications are preferably made from a single sheet of material. The boundaries of the various walls are defined by fold lines that permit the walls to pivot about one another. It should be understood, however, that the various walls could also be individually cut and shaped and pivotally attached to the appropriate other walls utilizing any suitable fastening means.

The viewer 20 generally forms a box-shaped structure when fully assembled. A large nose opening 50 is provided to permit the user's eyes to come as close as possible to the optical lenses while viewing the view material. This larger opening 50 increases the user's cone of vision while viewing the material. If the larger nose opening was not used, the user's eyes would be further from the lenses and a smaller cone of vision would result.

The right side wall 46 includes a fold line 52 that extends vertically. The left side wall 48 includes a similar vertical fold line 54. These fold lines permit the side walls to be folded when the viewer is placed in the collapsed position. Likewise, the top and bottom walls also include fold lines 56 and 58 respectively which divide the top and bottom walls substantially in half. These additional fold lines 56 and 58 also permit the top and bottom walls to be folded substantially flat when the viewer is in the collapsed position. The structure of the top, bottom and side walls create a bellows-like fold construction which allows the front wall to lie flat against the rear wall when the viewer is in the collapsed position (see FIG. 7). Also, this particular construction allows the front and rear walls to be moved apart from each other when the viewer is placed in its assembled position. When the viewer is assembled, the front and rear walls remain substantially parallel to each other to insure that the optical lenses are properly aligned with the viewing material appearing on the rear wall 24.

The viewer also includes a top holding tab 60 that extends transversely across the top wall of the viewer. This top holding tab 60 is advantageous since it is adapted to fit between the user's fingers to aid the user in holding and focusing the viewer during use.

This top holding tab 60 is preferably located along the fold line 56 found on the top wall. The right side wall 46 also includes an advantageous side holding tab 62. Likewise, the left side wall 48 includes a similar side holding tab 64. These side holding tabs 62 and 64 can be grasped by the user to move the viewer from the collapsed to the assembled position. Once the viewer is in the collapsed position, the user merely grasps the side holding tabs 62 and 64 and pushes them inwards, towards each other. The side holding tabs 62 and 64 cause the side walls 46 and 48 to move towards each other, also causing the top and bottom walls to expand out to the opened position shown in FIG. 1. These side holding tabs 62 and 64 can also be held by the user to focus the viewer once it is assembled. Like the top holding tab, these side holding tabs are preferably located along the fold lines 52 and 54 found on the side walls.

Figure 8:
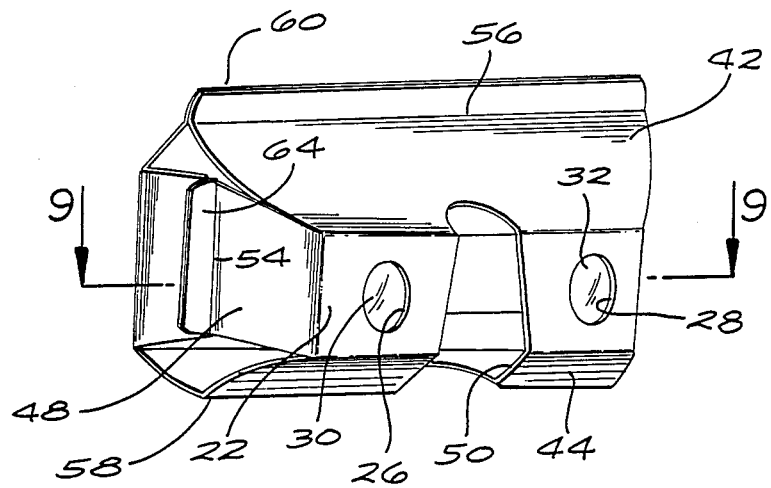
FIG. 8 is a perspective view showing the side walls of the viewer in the locked position.

The side walls 46 and 48 are also capable of being placed in a locked position (shown in FIGS. 8 and 9) to maintain the viewer in its assembled position during use. The viewer can be locked in the assembled position by merely pushing the side walls in towards each other until they can move no further. The side tabs will remain locked until the user applies sufficient pressure to the viewer to release the side walls from their locked position.

Figure 9:
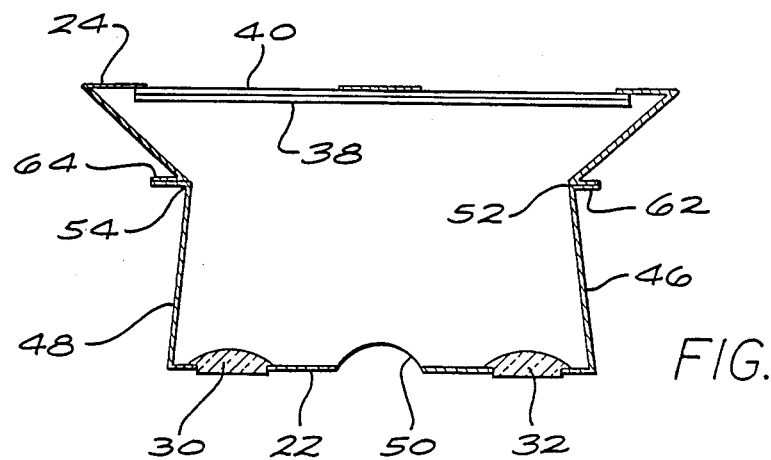
FIG. 9 is a cross sectional view of the foldable viewer taken along line 9—9 of FIG. 8.

The side walls remain in this locked position since the fold line on each side wall is offset from center. The placement of the fold line (usually about two-thirds of the way from the front wall to the rear wall) creates an inward force on the side walls that is sufficiently large enough to maintain the entire viewer in the locked position as is shown in FIG. 9. The side walls can be unlocked by simply pulling the side holding tabs outward slightly.

The top and bottom walls can still be moved slightly towards each other to provide fine focusing of the viewer even when it is in the locked position. If too much force is applied to the top or side walls, it is possible for the user to pop the side walls out of their locked position. However, if a gentle pressure is applied to the top and bottom walls, the user can adequately focus the device while keeping the side walls in the locked position.

Figure 10:
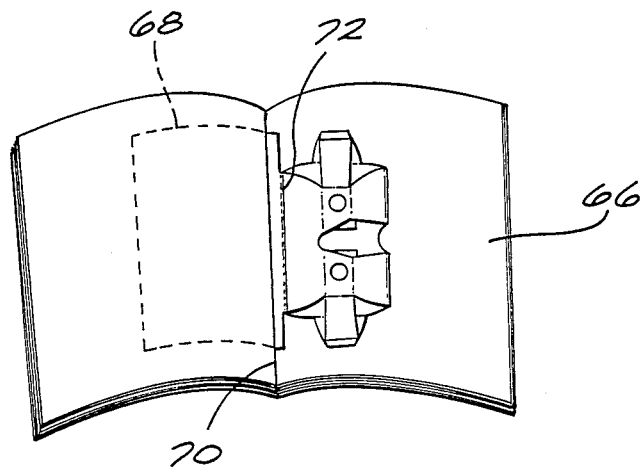
FIG. 10 is a perspective view showing the foldable viewer in a magazine-like publication.

The viewer 20 is shown in FIG. 10 as it would appear in a magazine or magazine-like publication 66. The viewer 20 includes holding means such as a holding wall 68 which is integral with the viewer and which can be placed or glued into the spine 70 of the magazine-like publication 66. In some cases, the holding wall will actually extend into the magazine and will be stapled with the spread sheets that form the magazine. In this arrangement, as shown in FIG. 10, the holding wall also acts as a "counterbalance" to help hold the viewer in the magazine. When the holding wall is glued into the spine of the magazine, a much smaller holding wall can be used.

The holding wall 68 is generally integral with the top holding tab 60 due to the construction of the blank that forms the foldable viewer. The structure of this blank will be discussed in greater detail below.

The boundary between the holding wall 68 and the holding tab 60 is generally a perforated line 72 which permits the user to rip the viewer from the magazine, leaving only the holding wall 68 intact in the magazine. This construction is advantageous since it allows the viewer to remain in the magazine until a user is ready to remove it. The removal of the viewer is very simple since one need only hold it in one hand and apply an upward or downward force to tear the viewer across the perforated line 72. Once removed from the magazine, the viewer can be easily assembled by the user.

Figure 7:
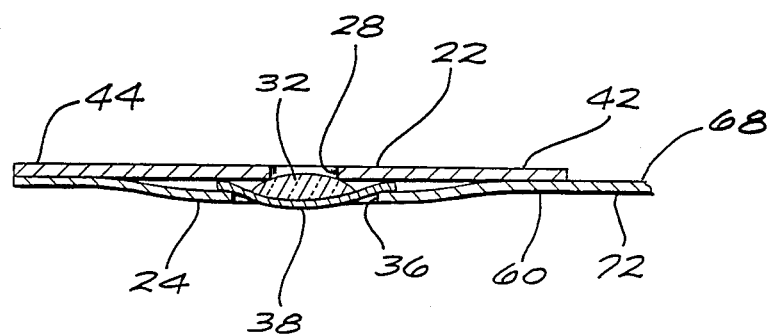
FIG. 7 is a cross sectional view of the viewer taken along line 7—7 of FIG. 6.

The specific construction of the present invention assures that the profile of the viewer will generally be about the thickness of two walls that make up the viewer (see FIG. 7). This design is advantageous over prior art viewers since most national magazines have strict thickness requirements for any insertion. The cross-sectional view of the viewer in FIG. 7 shows the optical lens 32 sandwiched between the front wall 22 and the transparency 38. It is quite possible that the optical lens 32 used with the present invention may be somewhat thicker than the thickness of a wall of the viewer. However, the thickness of the optical lens does not greatly increase the profile of the viewer since the lens 32 lies flat across the transparency 38 found on the rear wall 24. Since the rear wall 24 includes an opening 36, the transparency 38 can bow out a bit (as shown in FIG. 7), thus preventing the optical lens 32 from greatly increasing the thickness of the viewer. In some cases, the viewer may have its greatest thickness at the location of the optical lenses. Therefore, it is preferable to use a very thin optical lens to reduce the overall thickness of the viewer.

Figure 4:
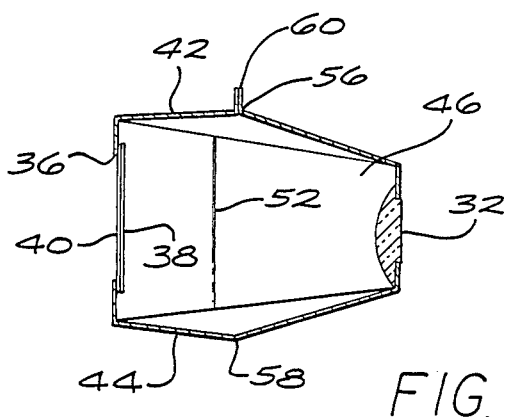
FIG. 4 is a partial cross-sectional view taken along line 4—4 of FIG. 1.

The transparency 38 used in conjunction with the present invention may be a simple film slide that shows the stereoscopic images. The transparency may also be affixed to a sheet of white opaque film 40 (see FIGS. 4 and 9) that helps diffuse the light that passes through the transparency. Techniques for obtaining the three-dimensional effect on the transparency are well known in the art and need not be explained here.

The present invention also includes an embodiment which allows the foldable viewer to be sent in direct mail as a postcard. This postcard version of the foldable viewer is shown in FIGS. 11 to 13. In this embodiment, a rectangular wall 74, somewhat similar to the holding wall 68 discussed above, extends from the top holding tab and lies flat against the collapsed viewer. Fastening means such as pieces of tape 76 are used to fasten the foldable viewer to the rectangular wall 74. (FIG. 12). The rectangular wall 74, like the holding wall 68, includes a perforated line 72 which allows the user to rip the viewer away from the rectangular wall. The cross-section of the post card embodiment (FIG. 13) is again very thin which allows the device to be sent in direct mail without the need for additional mailing envelopes.

The foldable viewer is generally folded against the rectangular wall 74 so that the rear wall 24 is visible to the user (FIG. 12). This arrangement protects the optical lenses from possible damage during mailing. If the arrangement was reversed, i.e., if the optical lenses were visible, the lenses could possibly be scratched or cracked inadvertently during mailing. Thus, the transparencies act as a cushion or protective backing to prevent damage from occurring to the optical lenses.

Figure 5:
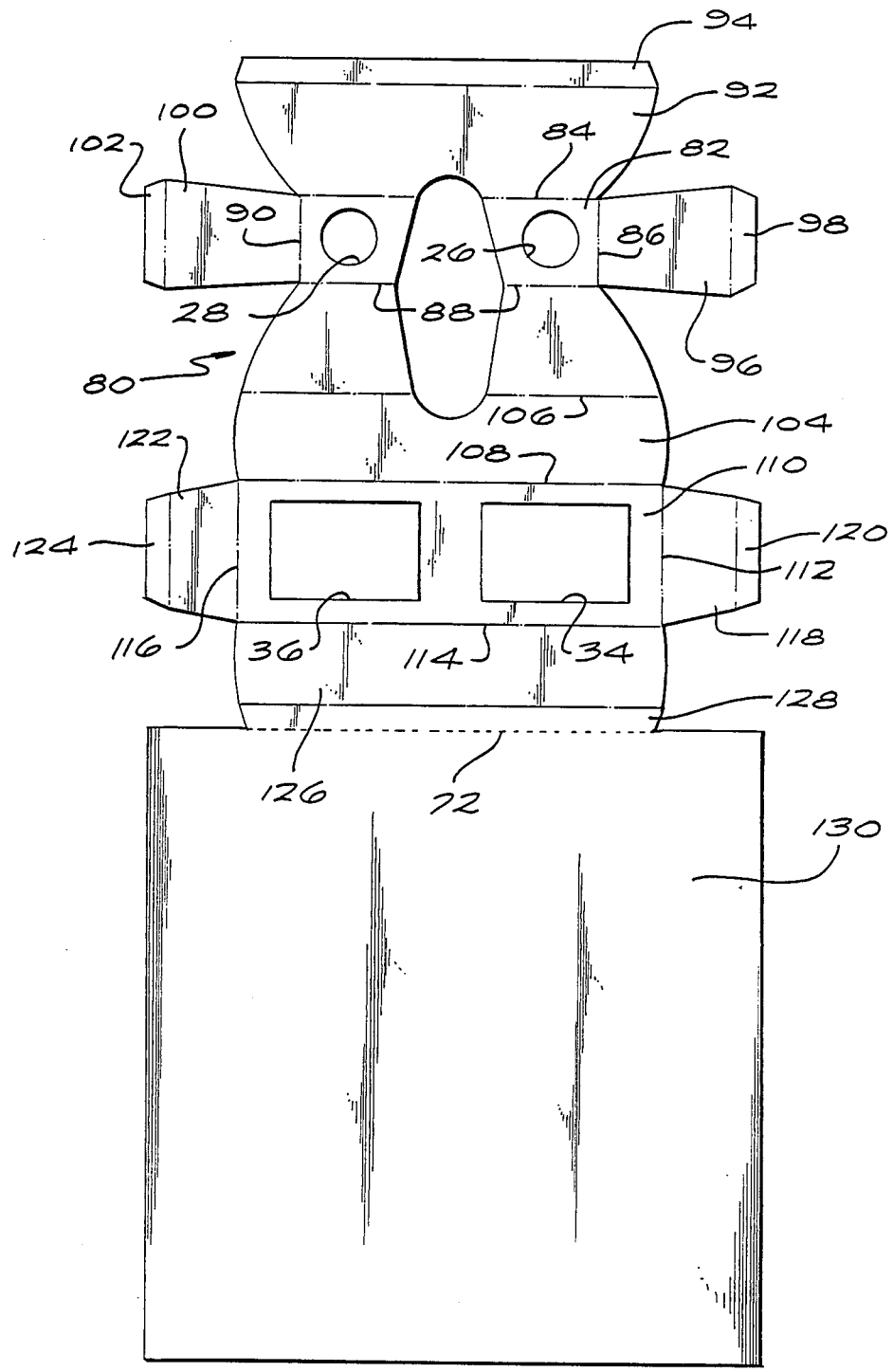
FIG. 5 is a plan view of the blank used to form the foldable viewer built in accordance with the present invention.
Figure 6:
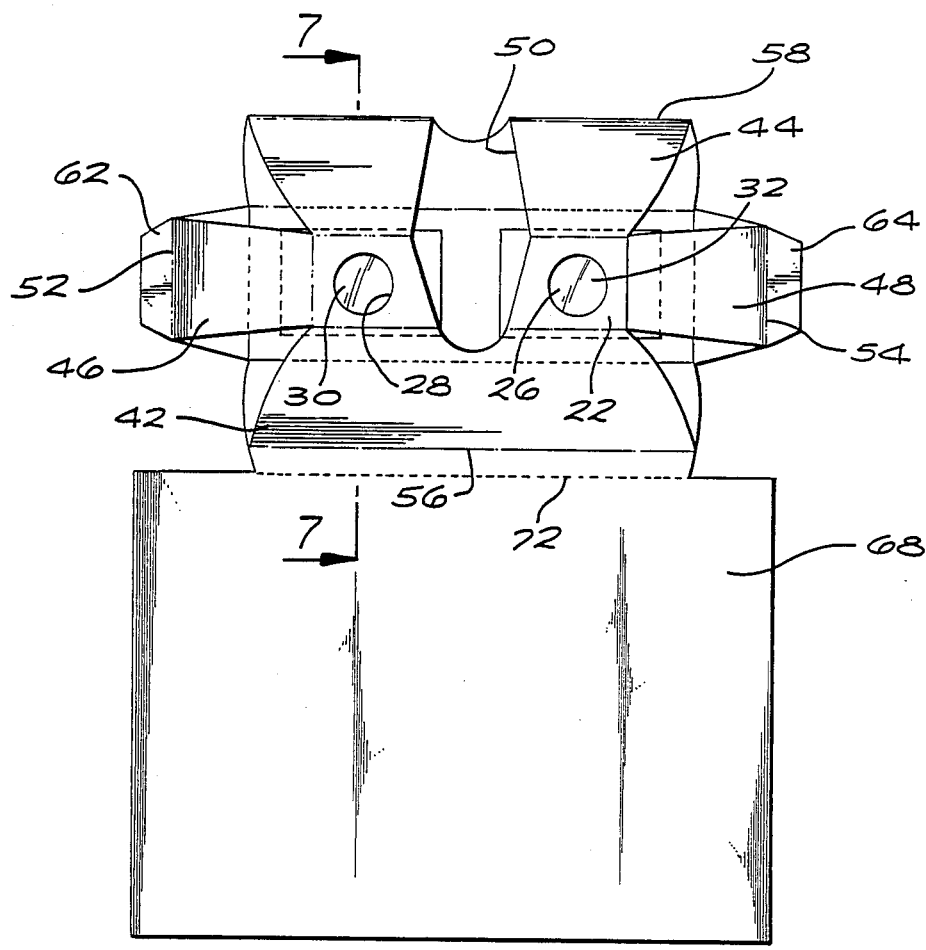
FIG. 6 is a plan view showing the foldable viewer in its flattened or collapsed position.

The blank 80 which forms the viewer is shown in FIG. 5. The blank 80 includes as first portion 82 that forms the front wall of the viewer. This first portion 82 also includes a pair of lens-receiving openings 26 and 28 over which the optical lenses are placed. The first portion 82 also includes a first edge 84, a second edge 86, a third edge 88 and a fourth edge 90. Generally, the first edge 84 is directly opposite the third edge 88 and the second edge 86 is directly opposite the fourth edge 90. These first, second, third and fourth edges are fold lines that permit the respective walls of the viewer to pivot during usage.

The blank 80 further includes a second portion 92 that forms a part of the top wall of the viewer. This second portion 92 extends along the first edge 84 of the first portion 82. This second portion 92 also includes a tab portion 94 which helps form the top holding tab 60 found on the assembled viewer.

The blank also includes a third portion 96 that forms part of the left side wall. This third portion 96 extends along the second edge 86 of the first portion 82. This third portion 96 also includes a tab portion 98 which is later glued to a corresponding tab located on one of the other portions of the blank. This tab portion 98 also forms part of the side holding tab of the viewer.

A fourth portion 100 that forms a section of the right side wall of the viewer extends along the fourth edge 90. This fourth portion 100 also includes a tab portion 102 that forms the other side holding tab of the viewer.

The blank also includes a fifth portion 104 that forms the bottom wall of the viewer. This fifth portion 104 extends along the third edge 88 and also includes another fold line 106 that extends transversely across it. This fifth portion 104 includes a fifth edge 108. A sixth portion 110 that forms the remaining section of the rear wall extends along this fifth edge 108. This sixth portion 110 also includes a sixth edge 112, a seventh edge 114 and a eighth edge 116. The fifth edge is generally opposite the seventh edge 114 and the sixth edge 112 is directly opposite the eighth edge 116. These edges are also fold lines.

A seventh portion 118 extends along the sixth edge 112 to form the other section of the left side wall. This seventh section also includes a tab portion 120 which is glued to the tab portion 98 found on the third portion of the blank. These two tabs portion 98 and 120 form the left side holding tab located on the viewer.

An eighth portion 122 also extends along the eighth edge 116 to form the other section of the right side wall. This eighth edge also includes a tab portion 124 that is glued to the tab portion 102 found on the fourth portion of the blank. These tabs, when glued together, form the other side holding tab of the viewer. The eighth portion 122 and fourth portion 100 also cooperate to form the right side wall of the viewer.

The blank also includes a ninth portion 126 that forms the remaining section of the top wall of the viewer. This ninth portion 126 also includes a tab portion 128 that is glued together with the tab portion 94 formed on the second portion of the blank. The ninth and second portion of the blank cooperate to form the top wall while the two glued tabs 128 and 94 form the top holding tab of the viewer.

The blank may also include a tenth portion 130 that extends along the tab portion 128 of the ninth portion 126. This tenth portion 130 forms the holding wall used to keep the folded viewer in the magazine-like publication. The boundary between the tenth portion and the tab 128 of the ninth portion is defined by a perforated line 72. This perforated line permits the collapsed viewer to be torn from the holding wall after the viewer has been placed in the magazine.

Figure 3:
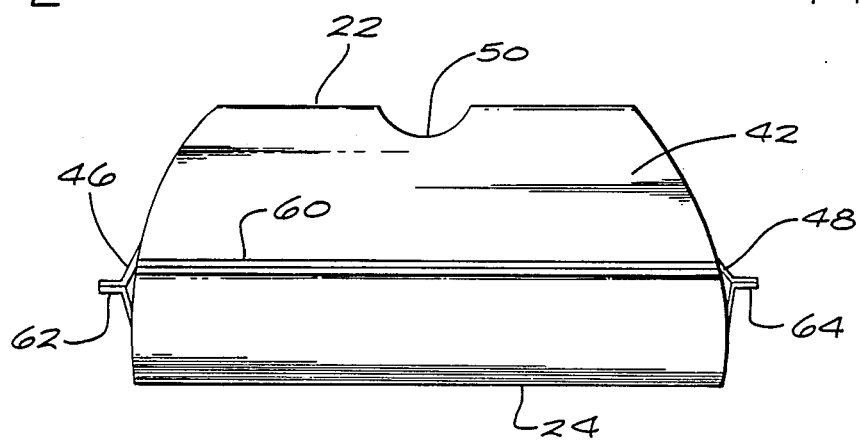
FIG. 3 is a plan view of the foldable viewer as it is shown in FIG. 1.

This tenth portion 130 may alternatively define the rectangular wall that forms the postcard version of the invention. The tenth portion may be larger in size than the one depicted in FIG. 3 since the entire viewer has to be affixed to the rectangular wall. However, this portion would be similar to the one depicted in FIG. 3 since it would still be connected to the ninth portion and would be separated by a perforated line.

The blank 80 can be stamped cut using machinery well known in the art. Once formed, the blank can be assembled into its collapsed position by simply folding the blank along the fold line 106 that extends across the fifth portion of the blank. Prior to the folding of this blank, glue can be applied to the tabs portions found on the second, third and fourth portion of the blank so that the respective portions can be glued together to form the collapsed viewer. Also, the optical lenses would have to be first placed on the front wall using glue or any other means to maintain the lenses in place. Similarly, the transparency(s) would have to be placed over the openings found on the rear wall 24. Once the lenses and transparency(s) have been placed on the blank, the blank can be folded over so that the various tabs portions can be glued together. Once glued in place, the blank will remain in the collapsed position and can be easily placed in a magazine publication.

The thickness of the paper forming the blank will depend upon the desired use for the viewer. For instance, if the viewer is to be placed in a magazine, the material that makes up the blank should be thin, but sturdy. For other uses, a thicker piece of material (which may be less expensive) could possibly be used. Generally, cardboard or paper board is used to form the viewer. However, any other suitable material may be used. Again, all the tabs, walls and openings of the blank can be formed in a single stamping operation. The placement of the lenses and transparencies can either be done by machinery or by hand. The gluing of the tab portions could also be done by high speed machinery or by hand. High speed machinery should be used especially if a large number of viewers is required.

The optical lenses can be made from an inexpensive plastic or plastic-like material. Alternatively, the lenses can be made from glass or other similar high quality material. The quality of the lenses can vary without departing from the spirit and scope of the invention. Generally, the lenses have a focal length that is approximately the distance between the front and rear walls when the viewer is fully assembled. The viewer can be focused by adjusting the distance between the front wall and the rear wall. Again, this focusing can be accomplished by moving either the top and bottom walls or the side walls to move the front and rear walls relative to each other.

In using the present invention, the user merely grasps the side holding tabs and pushes them inwards until the side, top and bottom walls move out perpendicularly with the rear and front walls. Alternatively, the user can grasp the edges of the top and bottom walls and simply squeeze these walls towards each other until the box-like structure is obtained.

The user can either grasp the side holding tabs to focus the optical lenses with the viewing material or can alternatively move the top and bottom towards or away from each other for focusing. The side tabs can be placed into the locked position by simply pushing them inward until they can move no further. The viewer can be unlocked by merely pulling the side holding tabs outward.

Thus, there has been illustrated and described a foldable viewer and a blank that forms the viewer that fulfill all the objects and advantages set forth above. It should be understood that many changes, modifications, variations and other uses and applications will become apparent to those skilled in the art after considering the disclosure and the accompanying drawings. Therefore, any and all such changes, modifications, variations and other uses and applications that do not depart from the spirit and scope of the invention are deemed to be covered by the invention which is limited only by the following claims.

What is claimed is:

1. A foldable viewer, foldable from a collapsed condition to an assembled condition; said viewer being for mass distribution by binding within magazines or the like for mailing, which type of distribution requires extremely thin outer edges; and said viewer comprising:

a front wall of sheet material having a pair of lens-receiving openings defined therein and a pair of optical lenses affixed thereto, said front wall having top, bottom, left side and right side boundaries defined at least in part by fold lines;

a rear wall of sheet material having image means affixed thereto for viewing, said rear wall having top, bottom, left side and right side boundaries defined at least in part by fold lines; and means for moving said front and rear walls from the collapsed condition to the assembled condition; said moving means comprising:

a bottom wall of sheet material that is continuous with both the front and rear walls, along the respective fold lines that form the respective bottom boundaries of the front and rear walls; said bottom wall thereby interconnecting said bottom boundaries, and a top wall of sheet material that is continuous with both the front and rear walls, along the respective fold lines that form the respective top boundaries of the front and rear walls; said top wall thereby interconnecting said top boundaries, and left and right side walls of sheet material that are each continuous with both the front and rear walls, along the respective fold lines that form the left and right side boundaries respectively; said side walls thereby interconnecting said side boundaries;

at least three of said bottom, top and side walls being each in the form of a pair of separate sections, each separate section terminating in a substantially vertical tab; whereby there are at least three pairs of substantially vertical tabs;

each pair of substantially vertical tabs being secured together while they both project away from the associated wall, so that each pair of tabs forms a combination tab that has exactly two thicknesses of sheet material and that projects outward from the viewer; whereby there are at least three of said outward-projecting two-thickness combination tabs;

said front and rear walls in the collapsed condition being directly juxtaposed to each other, to form in combination an extremely thin region of only two thicknesses of sheet material;

said pair of top wall sections in the collapsed condition being directly juxtaposed to each other, to form in combination an extremely thin region of only two thicknesses of sheet material;

said pair of bottom wall sections in the collapsed condition being directly juxtaposed to each other, to form in combination an extremely thin region of only two thicknesses of sheet material;

said pair of left side wall sections in the collapsed condition being directily juxtaposed to each other, to form in combination an extremely thin region of only two thicknesses of sheet material; and said pair of right side wall sections in the collapsed condition being directly juxtaposed to each other, to form in combination an extremely thin region of only two thicknesses of sheet material;

whereby in the collapsed condition said at least three outward-projecting two-thickness combination tabs maintain the extreme thinness of the other regions, particularly along outer edges of the viewer to satisfy requirements for mass distribution by binding in such magazines for mailing.

2. The viewer of claim 1, wherein:

two of said at least three outward-projecting two-thickness combination tabs are parts of said side wall respectively; and each of said combination tabs in said side walls forms a side holding tab that extends substantially vertically along said side wall.

3. The viewer of claim 2, wherein:

one of said at least three outward-projecting two-thickness combination tabs is a part of said top wall; and said combination tab in said top wall forms a top holding tab extending transversely across said top wall.

4. The viewer of claim 3, further including:

a rectangular wall having one edge pivotally affixed to said top holding tab, said rectangular wall being foldable over said front wall when said viewer is in the collapsed position; and means for fastening at least a portion of said bottom wall against said rectangular wall.

5. The viewer of claim 4, wherein:

the boundary between said top holding tab and said rectangular wall is a perforated line.

6. The viewer of claim 5, wherein:

said fastening means comprises adhesive tape.

7. The viewer of claim 2, wherein:

the sheet material has a fold line between each sidewall section and its tab, whereby each side wall is connected with its outward-extending two-thickness side holding tab along a pair of fold lines;

the side walls can be buckled inward by reverse folding along said pair of fold lines at each side holding tab, to lock the viewer in the assembled condition, and while buckled inward can be adjusted by manipulation of the side holding tabs to focus the optical lenses relative to the image means;

the two top-wall sections consist of a rear top-wall section that is continuous with the rear wall and a front top-section that is continuous with the front wall, and the length of the rear top-wall section has a first ratio to the length of the front top-wall section;

the two bottom-wall sections consist of a rear bottom-wall section that is continuous with the rear wall and a front bottom-wall section that is continuous with the front wall, and the length of the rear bottom-wall section has substantially said first ratio to the length of the front bottom-wall section;

the lengths of the rear and front bottom-wall sections being measured in a direction substantially perpendicular to the bottom boundary;

at each side, the two side-wall sections consist of a rear side-wall section that is continuous with the rear wall and a front side-wall section that is continuous with the front wall, and the length of the rear side-wall section has a second ratio to the length of the front side-wall section;

the lengths of the rear and front side-wall sections being measured in a direction substantially perpendicular to the side boundaries; and said second ratio is significantly smaller than said first ratio so that, when the side walls are buckled inward to lock the viewer in the assembled condition, the optical lenses are very nearly focused relative to the image means;

whereby when the side walls are buckled inward the manipulation of the side holding tabs is only to make a small correction in the focusing.

8. The viewer of claim 7, futher including:

means for holding said viewer in a magazine-like publication.

9. The viewer of claim 8, wherein:

said holding means comprises a holding wall extending from said viewer, said holding wall being adapted to extend into the spine of said magazine-like publication.

10. The viewer of claim 9, wherein:

said holding wall has a perforated line extending thereacross.

11. The viewer of claim 1, further including:

means for holding said viewer in a magazine-like publication.

12. The viewer of claim 11, wherein:

said holding means comprise a holding wall attached to said viewer, said holding wall being adapted to extend into the spine of said magazine-like publication.

13. The viewer of claim 12, wherein:

said holding wall includes a perforated line extending thereacross.

14. The viewer of claim 1, futher including:

a substantially rectangular wall extending from said viewer and means for fastening said viewer to said rectangular wall.

15. The viewer of claim 14, wherein:

said fastening means comprises adhesive tape.

16. A blank for a viewer, comprising:

a first portion defining a front wall having a pair of lens-receiving openings defined therein, said first portion having first or top, second or first-side, third or bottom, and fourth or second-side boundaries;

said first and third boundaries being substantially opposite each other and said second and fourth boundaries being substantially opposite each other, and all of said boundaries being at least in part fold lines;

a second portion defining a front section of a top wall, said second portion extending along said first or top boundary;

a third portion defining a front section of a first side wall, said third portion extending along said second or first-side boundary;

a fourth portion defining a front section of a second side wall, said fourth portion extending along said fourth or second-side boundary;

a fifth portion defining a bottom wall, said fifth portion being divided by a fold line into a front section extending along said boundary and a rear section having a fifth boundary extending opposite said third boundary;

a sixth portion defining a rear wall, said sixth portion having sixth or first-side, seventh or top, and eighth or second-side boundaries;

said sixth boundary being substantially opposite said eighth boundary and said seventh boundary being opposite said fifth boundary, and all of these boundaries being at least in part fold lines;

a seventh portion defining a rear section of the first side wall, said seventh portion extending along said sixth boundary;

an eighth portion defining a rear section of the second side wall, said eighth portion extending along said eighth boundary; and a ninth portion defining a rear section of the top wall, said ninth portion extending along said seventh boundary;

the length of the ninth portion having a first ratio to the length of the second portion;

the length of the rear section of the fifth portion having substantially said first ratio to the length of the front section of the fifth portion;

the lengths of the rear and front sections of the fifth portion being measured in a direction substantially perpendicular to the fifth boundary;

the length of the seventh portion having a second ratio to the length of the third portion;

the length of the eighth portion having substantially said second ratio to the length of the fourth portion;

the lengths of the third, fourth, seven and eighth portions being measured in a direction substantially perpendicular to the sixth boundary; and said second ratio being significantly smaller than said first ratio so that when assembled the viewer is lockable near a desired focal distance between said front and rear walls.

17. The blank of claim 16:
wherein said ninth portion includes a ninth boundary extending opposite said seventh boundary and
further including a tenth portion defining a holding wall, said tenth portion extending along said ninth boundary.

18. The blank of claim 17, wherein:
each of said second, third, fourth, seventh, eighth and ninth portions includes a tab portion that extends outward from the blank;
said tab portions being for securing together in pairs while they extend outward so that no part of the viewer when assembled has more than two layers of the blank.

19. The blank of claim 18, wherein:
said sixth portion has at least one opening defined therein.

20. The blank of in claim 19, wherein:
each of said first, second and fifth portions has an opening defining a nose opening therein.

21. The blank of claim 16, wherein:
said fifth portion has a transverse fold line extending thereacross.

22. The blank of claim 16:
wherein said ninth portion includes a ninth boundary extending opposite said seventh boundary and
further including a tenth portion to define a retangular wall for fastening the blank into a magazine or the like for mass distribution, when said blank is configured as said viewer but still collapsed, said tenth portion extending along said ninth boundary.

* * * * *